T. S. PATTERSON.
TRANSMISSION GEAR.
APPLICATION FILED FEB. 1, 1907.
1,129,720.
Patented Feb. 23, 1915.
2 SHEETS—SHEET 1.
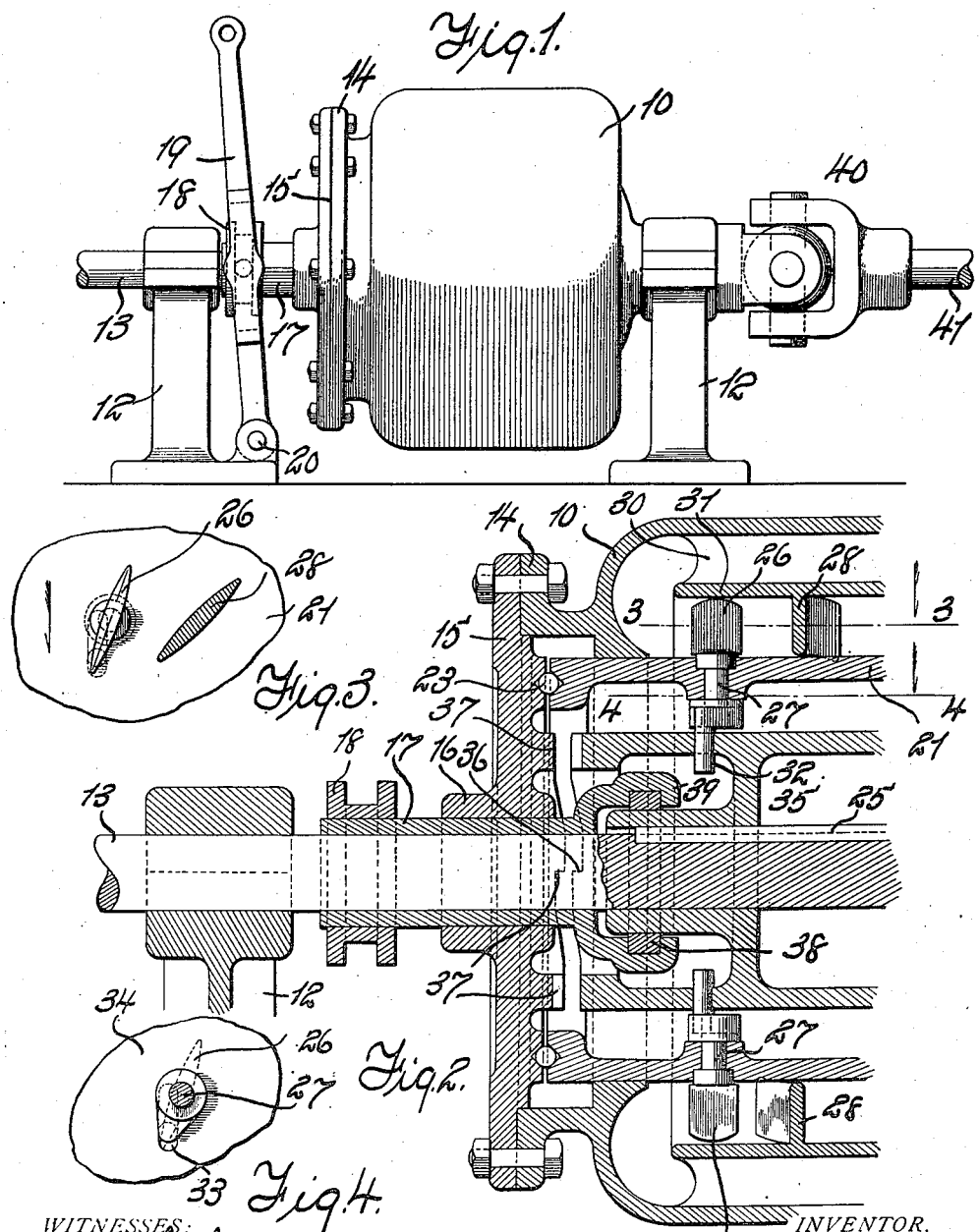
WITNESSES:
Frank L. Stubbs
Ralph Lancaster
INVENTOR.
Thomas S. Patterson,
BY
W. B. Hutchinson,
ATTORNEY.

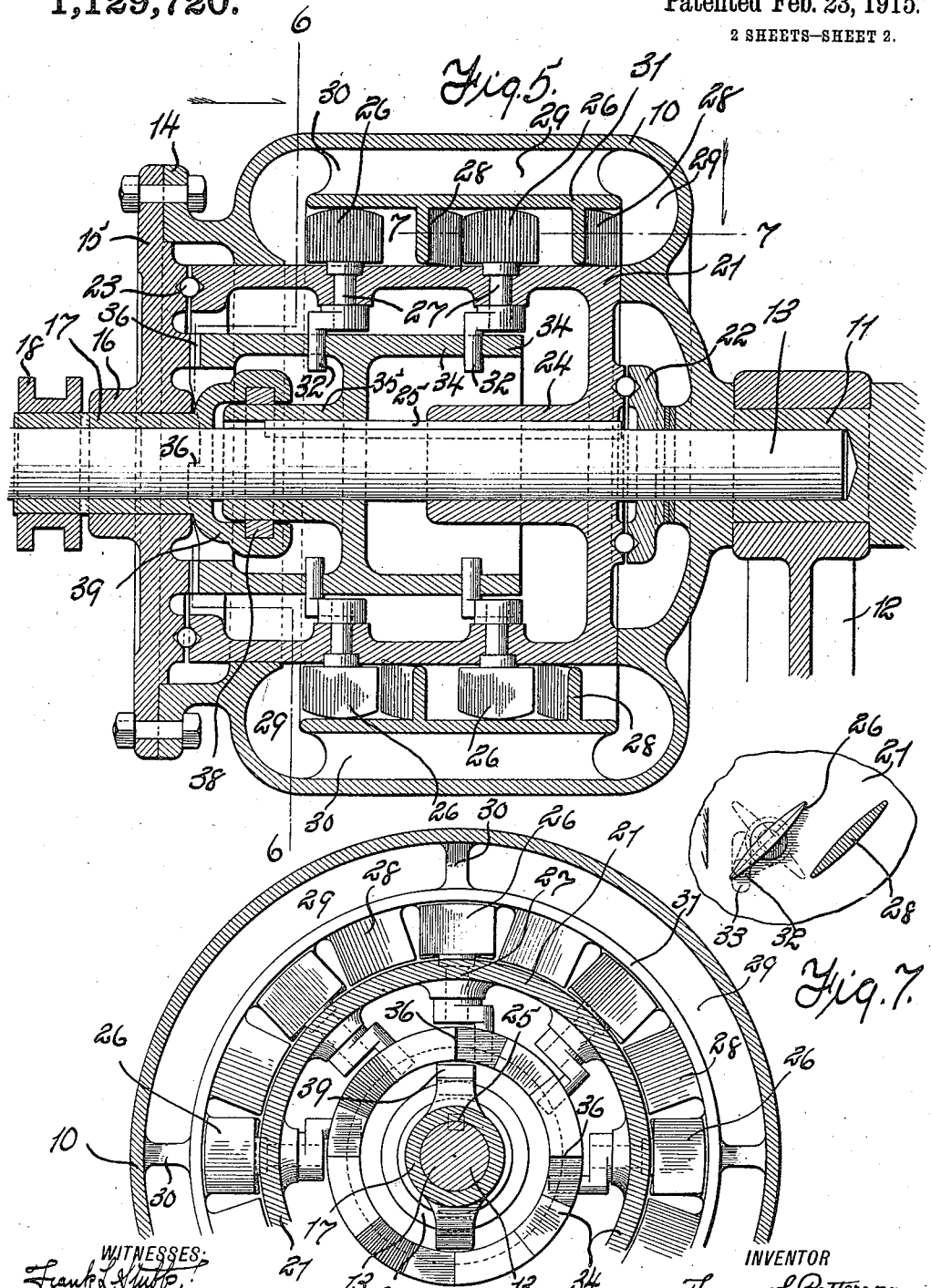

UNITED STATES PATENT OFFICE.

THOMAS S. PATTERSON, OF PHILADELPHIA, PENNSYLVANIA, ASSIGNOR TO PATTERSON HYDRO-POSITIVE TRANSMISSION COMPANY, OF CAMDEN, NEW JERSEY, A CORPORATION OF NEW JERSEY.

TRANSMISSION-GEAR.

1,129,720.  Specification of Letters Patent.  Patented Feb. 23, 1915.

Application filed February 1, 1907. Serial No. 355,256.

*To all whom it may concern:*

Be it known that I, THOMAS S. PATTERSON, of the city of Philadelphia, county of Philadelphia, and State of Pennsylvania, have invented a new and Improved Transmission-Gear, of which the following is a full, clear, and exact description.

My invention relates to improvements in transmission gears such as are used especially on automobiles, but the invention relates also to such gears wherever used to speed a driven shaft up to its maximum, before the said shaft is coupled direct to the driving shaft of the engine.

It is well known that there has been more trouble with transmission gears on automobiles, and in connection with analogous motor driven appliances, than with almost any other part of the machinery, and the object of my invention is to overcome this difficulty and produce a transmission gear which while it may be started as quickly as need be, cannot be injured by reason of any driving connections with it.

My invention is intended to produce a yielding transmission gear which will quickly speed the driven shaft, as for instance, the driving axle of an automobile, up to the desired point, but which will at the same time have such a yielding nature that it cannot be injured, and moreover my invention is intended to produce a structure of this kind which has absolutely no cogs to strip nor friction surfaces to slip. In carrying out this idea, I use the principle of a propeller, and have a casing containing a clutch filled with oil or other liquid, together with clutch mechanism controlling the propeller blades, which by their direction cause the casing and the parts connected with it to turn gradually and in the desired direction. By regulating the controlling blades, it will be seen that the casing may be made to turn either forward or backward, or that the blades can be fixed so that the casing will remain in a neutral position.

With these ends in view and with the general object of making a transmission gear which can be absolutely relied on, my invention consists of certain features of construction and combinations of parts which will be hereinafter described and claimed.

Reference is to be had to the accompanying drawings forming a part of this specification, in which similar letters and figures of reference indicate corresponding parts in all the views.

Figure 1 is a side elevation of my invention. Fig. 2 is a broken longitudinal section thereof. Fig. 3 is a detail on the line 3.3 of Fig. 2, showing the position of the fixed and movable blades when the device is moving slowly ahead. Fig. 4 is a section on the line 4.4 of Fig. 2, and shows particularly the means for adjusting a movable blade. Fig. 5 is a longitudinal section through the working part of the device, and shows the clutch and casing in position to do work. Fig. 6 is a cross section on the line 6.6 of Fig. 5, and Fig. 7 is a fragmentary section on the line 7.7 of Fig. 5.

The apparatus is provided with a hollow casing 10, which can be of any approved general construction, and one end of this is formed into a bearing 11, which is mounted in a suitable support or hanger 12, the whole casing being journaled on the main shaft 13, which can be coupled to the engine driving shaft in any usual way, or can be directly driven in some cases. The shaft 13 is as stated journaled at one end on the part 11 of the casing 10, and at the other end the shaft is journaled in a suitable support 12. For convenience the casing 10 has one end formed into a flange 14, which abuts with a second flange 15, and this is provided with a hub 16 which turns on the sleeve 17, the latter being mounted on the shaft 13, and slidable backward and forward thereon so as to operate a clutch as presently described. The sleeve 17 can be operated in any usual manner, and I have shown it provided with the customary grooved pulley 18, which receives the forked part of the lever 19, this being fulcrumed at the bottom as shown at 20. At its free end the lever can be connected up to be operated by hand or foot power precisely as such levers are usually connected and operated.

Within the casing 10 is a rotatable member 21 of cylindrical form, which is provided with suitable thrust bearings 22 and 23 at the ends, and with an elongated hub 24 which slides on the key or feather 25 of the shaft 13, so that the member 21 slides on and turns with the said shaft. The member or cylinder 21 carries on its outer periphery a series of blades or paddles 26, which can be of any approved form, like the blades of a propeller, but which I have shown as straight blades, tapering at the edges as shown clearly in the drawings. These several blades 26 are arranged in pairs as shown, and carried by shafts 27 which project through and are journaled in the cylinder or member 21, the movable blades 26 coming opposite corresponding fixed blades 28, as shown clearly in Figs. 2 and 5. I have shown a pair of each kind of blades in each series, and the fixed and movable blades are arranged around the entire periphery of the member 21, the movable blades being carried by the said member, while the fixed blades 28 are fixed to an inner part 31 of the casing 10, as presently described. It will be obvious that the number of fixed and movable blades in a series can be varied indefinitely without affecting the principle of the invention.

The entire casing 10 is adapted to be filled with oil or other liquid, and in order that a current may be maintained, a by-pass 29 is arranged in the entire outer portion of the casing 10, between the outer wall of the casing and an inner wall 31, to which the fixed blades 28 can be secured. The two walls are stiffened by convenient partitions 30. It will be seen that when the movable blades are pitched so as to set the liquid in motion, the latter will impinge against the blades 28, and the part which passes will come back through the by-pass 29, this being kept up as long as the pitch of the blades remains right for such a motion. It will also be seen that the current can be reversed by simply shifting the movable blades. It will be further seen, too, that all the blades might be moved instead of one of each pair moved and the other fixed, but this would complicate the mechanism.

The shanks 27 of the movable blades extend through the wall of the member 21, and have at their inner ends cranks 32 entering slots 33 in the clutch 34, which is also preferably of cylindrical form, and which has a hub 35 sliding on the feather or key 25, already referred to. The clutch has also on one end teeth 36 which engage corresponding teeth 37 on the flange 15 of the casing 10, the teeth being after the style common in toggle clutches, but I wish it understood that any usual clutch connection between the parts 34 and 15 can be used without affecting the principle of the invention. The clutch 34 is moved from the sleeve 17, and any suitable mechanism can be arranged to connect the parts. As shown, I have used the ordinary ring 38, which is fast to the hub 35, and this is spanned by the arms 39 fast on the sleeve 17, so that when the sleeve is pushed in, the clutch 34 will also be pushed in to the position shown in Fig. 2, while when the opposite movement is made, the clutch moves to the position shown in Fig. 5, and the teeth 36 and 37 engage with each other.

It will be seen from the foregoing description that the transmission is from the reduced end casing 10, and to this end the reduced end 11 of the casing connects by the universal joint 40 with the shaft 41, which can be connected back to the axle to be driven in any usual way, as my invention lies wholly in the casing 10 and its contained matter and connections.

If the transmission gear is to be driven in one direction, say forward, the clutch is moved so as to bring the teeth 36 and 37 nearer together, but not into engagement, and this movement pitches the blades 26 as shown in Fig. 7 so as to set up a current which will actuate the blades 28 to turn the casing 10 in the direction to transmit the desired forward movement. It will be seen that this turning of the blades can be gradual if desired, and that owing to the yielding nature of the transmitting medium, the speed will gradually come up. When the casing 10 is turning at the desired speed, say high speed, the clutch is moved still further so as to bring the teeth 36 and 37 into engagement. If now it is desired to reverse, the clutch is moved in the opposite direction, thus first turning the blades 26 to a neutral position and then to the opposite position from that first indicated, into the position shown by dotted lines in Fig. 7. This will serve first as a check or brake, and then it will reverse the current and turn the casing 10 in the opposite direction. It will be seen that by reversing I get a flexible yet powerful brake. It will be seen further that the gear can be very easily controlled in either direction, on the principle that a given resistance may be overcome in a given distance in a given time by a given power, and the same resistance may be overcome in the same distance by a lesser power and a longer time, consequently I am able to get perfect control.

From the foregoing description it will be seen that I have devised a clutch in which the principle of the propeller is used to start, stop, or reverse the mechanism, so that there is very little likelihood of any breaking strain being brought upon any of the parts, and the nature of the invention is such that it will be understood that many of the details can be changed without affecting the principle.

Having thus fully described my invention, I claim as new and desire to secure by Letters Patent:—

1. A liquid transmission gear consisting of a shaft, a hub thereon, a casing having annular inner and outer walls forming with the hub circulating passages for the liquid, an annular series of relatively short inclined blades extending from the inner wall toward the hub and being free from the casing at their inner ends, with a second annular set of relatively short blades mounted on the hub and extending toward the inner wall of the casing, said second set of blades being situated at the side of the first mentioned blades, with means for positively coupling the shaft and the casing.

2. A liquid transmission gear consisting of a shaft, a hub thereon having a plurality of annular sets of movably mounted blades, a casing surrounding said blades and having inner and outer walls forming with the hub circulating passages for the liquid, a plurality of annular series of inclined blades extending from the inner wall of the casing toward the hub and alternating with the series of blades mounted on said hub, with means for simultaneously adjusting the angles of the various series of blades carried by the hub, with means for positively coupling the hub and the casing.

3. A liquid transmission gear consisting of a shaft, a hub thereon having a plurality of annular sets of movably mounted blades, a casing surrounding said blades and having inner and outer walls forming with the hub circulating passages for the liquid, a plurality of annular series of inclined blades extending from the inner wall of the casing toward the hub and alternating with the series of blades mounted on said hub, with a longitudinally movable cylinder mounted concentrically with the shaft, and means connecting it to the blades of the hub for simultaneously adjusting the positions of said blades, with means for positively connecting the hub and the casing.

4. The combination of a shaft, a casing containing liquid, blades on the casing and blades on the shaft, both sets of blades being mounted in the liquid space of the casing, means for shifting one set of blades in respect to the other and positive clutch mechanism actuated when the blades are shifted to a given position so as to positively lock the casing to the shaft, substantially as described.

5. An apparatus of the class described consisting of a liquid containing casing having within it series of blades, a rotatable member mounted within the casing and having a series of blades alternating with the series of blades of the casing, a sliding clutch within the casing capable of being thrown into and out of engagement therewith, and means for transmitting motion from the clutch to the blades whereby both of said parts are moved together.

6. An apparatus of the kind described comprising a rotatably mounted liquid containing casing having a series of fixed blades therein, a shaft supporting the casing, a clutch within the casing mounted on the shaft and adapted to engage with the casing, and a series of movable blades arranged opposite the fixed blades, and moved with the clutch, substantially as described.

7. An apparatus of the kind described comprising a rotatably mounted liquid containing casing having a series of fixed blades therein, an inner member rotatable independently of the casing and carrying a series of movable blades, a clutch within the casing adapted to engage a part thereof, and a connection between the clutch and the movable blades whereby the shifting of the clutch shifts the position of the blades, substantially as described.

8. An apparatus of the kind described consisting of a shaft, a liquid containing casing journaled on said shaft and provided with a series of blades, an inner member having a second series of blades, a clutch having a member slidable on but compelled to turn with the shaft and capable of engaging one end of the casing, with means for altering the pitch of the second set of blades by movement of the clutch, substantially as described.

9. An apparatus of the kind described, consisting of a shaft, a liquid containing casing mounted thereon and provided with a series of fixed blades, an inner member turning with the shaft, a series of movable blades carried by said inner member, a clutch having a member slidable on the shaft and capable of engagement with one end of the casing, and a crank connection between the clutch and the movable blades whereby the operation of the clutch changes the pitch of said blades, substantially as described.

10. A transmission gear comprising a rotatable casing having a series of blades, a rotatable member mounted within the casing and also having a series of blades, means for retaining liquid within the casing through which power is transmitted from one element to the other, and means for positively coupling said casing and the rotatable member.

11. A transmission gear comprising a rotatable casing having inwardly projecting blades, a rotatable member mounted within the casing and having blades projecting therefrom and alternating with the blades of the casing, means for retaining liquid in the space into which the blades project, and means for positively coupling said member and the casing.

12. The combination of a rotatable casing having a series of inwardly projecting blades, a rotatable member mounted within the casing and having blades projecting therefrom, said casing having a by-pass connected with the space occupied by the blades, and means for positively coupling the casing and the rotatable member.

13. The combination of a transmission gear comprising a liquid containing rotatable casing, a series of blades carried by the casing, a rotatable member within the casing and having a series of blades, one set of blades being fixed and the other adjustable, with means for positively coupling the casing and said member.

14. The combination in a transmission gear, of a casing having a series of blades therein, a rotatable member mounted within the casing and having a series of blades alternating with the blades of the casing, the casing having a by-pass communicating with the space in which the blades are mounted, the blades of the rotatable member being adjustable, means for adjusting the blades in unison, and means for positively coupling the casing and said rotatable member.

15. The combination of a casing, two sets of blades supported so as to be rotatable relatively to each other and having liquid around them within the casing, and means for positively coupling the members to which the blades are attached.

16. The combination of a liquid containing casing, two sets of relatively rotatable blades within the same, and means for positively coupling the two sets of blades.

17. In an apparatus of the class described, driving and driven members, fluid-operated transmission devices intermediate of said members, means operated at will for controlling the circulation within said transmission mechanism and thereby vary the relative motion of the driven member to the driving member, and means independent of the aforesaid controlling means whereby said members may be coupled for rotation as a unity.

18. In an apparatus of the class described, driving and driven members, fluid-operated transmission mechanism for rotating one member from the other member, means operated at will for controlling the circulation of fluid within said transmission mechanism and thereby vary the speed of the driven member relative to the driving member, and independent means for coupling said members for rotation as a unit.

19. In a fluid transmission gear, a fluid propelling member; a fluid propelled member; means for varying the transmission ratio between said members; and means for positively coupling the members.

20. In a fluid transmission gear, a fluid propelling member; a fluid propelled member; and means for positively coupling said members.

21. In a fluid transmission gear, a fluid propelling member; a fluid propelled member; and means for positively coupling said members; with means for varying the fluid driving capacity of one of the members.

22. In an apparatus of the class described, driving and driven members; fluid-operated transmission devices intermediate of said members; means operated at will for reversing the circulation of fluid within said transmission mechanism and thereby reversing the direction of movement of the driven member relatively to the driving member; and means independent of said reversing means whereby said members may be coupled for rotation as a unit.

23. In an apparatus of the class described, driving and driven members; fluid-operated transmission devices intermediate of said members; means operated at will for reversing the circulation of fluid within said transmission mechanism and thereby reversing the direction of movement of the driven member relatively to the driving member; and means independent of said reversing means whereby said members may be coupled for rotation as a unit when both members are revolving in the same direction.

THOMAS S. PATTERSON.

Witnesses:
M. E. MORRISON,
P. L. WOLFE.